March 3, 1964  M. E. ASH ETAL  3,123,476
PRODUCTION OF HOPPED WORT
Filed Jan. 3, 1962
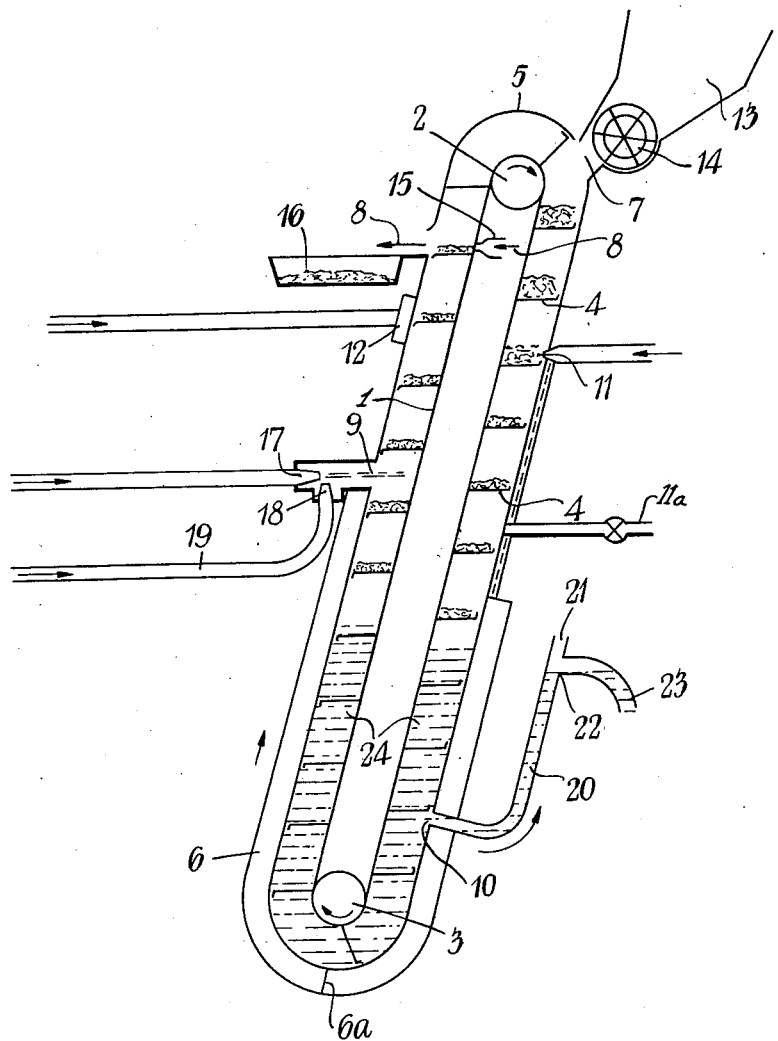

3,123,476
PRODUCTION OF HOPPED WORT
Michael Edward Ash, Ealing, London, George Cordery Phillpotts, Putney, London, and Gunter Wittenberg, London, England, assignors to Arthur Guinness Son and Company (Park Royal) Limited, London, England, a British company
Filed Jan. 3, 1962, Ser. No. 164,022
Claims priority, application Great Britain Jan. 12, 1961
8 Claims. (Cl. 99—50.5)

The invention relates to the hopping of wort, a stage in the brewing process which takes place prior to fermentation. The object of the hopping process is to extract from the hops and transfer to the wort certain desirable flavouring substances particularly humulone, or substances derived therefrom, which are generally considered to provide the bitter flavour in finished beer, and which in some cases may exercise a preservative function.

Broadly speaking the hopping stage in the brewing process consists in bringing together sweet or unhopped wort (i.e. wort fresh from the mash tun) and fresh or unspent hops (i.e. hops from which the desirable extracts have not yet been removed); boiling them for a suitable period to produce a chemical reaction during which the wort acquires the desired concentration of hop extracts; separating the spent hops (i.e. hops from which extracts have been removed) from the hopped wort (i.e. wort which has taken up the desirable hop extracts) and collecting the hopped wort for subsequent fermentation. During the boiling process the humulone being transferred from the hops to the wort is converted to isohumulone.

In the traditional process of brewing beer it is customary for sweet wort running from the mash tun to be collected in batches in a vessel known as a copper or kettle. Calculated quantities of hops are added during or after collection of these batches. After collection the whole is boiled for a period which is decided by the brewer in each case, but which is generally of the order of 1-2 hours. It should be noted that sometimes more than one batch is collected from the runnings of a single mash tun, with the result that the wort in different batches may be of widely different specific gravities. Normally boiling takes place either under a small positive pressure or at atmospheric pressure so that the temperature of the wort during boiling is close to the boiling point of wort at atmospheric pressure. After boiling has ceased, wort and hops are dropped into a vessel usually known as a hop back, which is a shallow vessel sometimes closed with a false bottom; that is a bottom consisting of plates containing apertures of such a size as to prevent the passage of spent hops through them. The hopped wort finally passes out through the false bottom of the hop back, and is then moved to the next stage in the brewing process.

The traditional hopping process suffers from a number of disadvantages as follows:

(a) During boiling, the wort forms precipitates which are normally termed "trub." This precipitation effect is often termed the "break." Where precipitation results from raising the temperature of the wort it is known as the "hot" break; where it results from contact between the wort and hop tannins it is often known as the "hop" break. There is a tendency for desirable hop extracts to adhere to the break material, and thus to be lost to the wort. This inevitably limits the extractive efficiency of the traditional process. It is important that break should take place during the hopping stage because if potentially precipitable solid material is allowed to remain in solution in wort and to pass with it to the final stages of the brewing process, this material is liable to cause imperfection in the finished beers, for example by the formation of hazes.

(b) The traditional coppers and hop backs are expensive, occupy considerable space and require much labour for cleaning and general attendance.

(c) It is difficult to control the traditional process in such a way as to give a predetermined concentration of isohumulone in the finished beer. The method often applied to achieve this object is for the hops to be analysed for humulone content, as a result of which a decision may be made as to the exact weight of hops to be added to each batch of wort. However, it is extremely difficult to obtain a representative sample from a bulk quantity of hops: therefore estimation of the average humulone content of a bulk quantity of hops is very difficult, especially since, in addition, humulone determination in the laboratory is subject to a considerable degree of error.

(d) During the boiling some degradation of isohumulone may take place under certain conditions and it is extremely difficult to arrange conditions to keep it to a minimum, because the nature of the process is such that the operator cannot know how successful he has been until the whole batch has been completed. He can therefore only apply correctives to succeeding batches, by which time other factors outside his immediate control may have altered the conditions.

(e) During the boiling in the traditional copper or kettle, steam is allowed to escape and, as already explained, the vessel is subject to small or zero pressure above atmospheric. Essential oils in the hops become vapourised during the boiling, and the escaping steam carries with it certain of these essential oils, which may or may not be desirable. The traditional process thus affords no method of control of the concentration of such oils in the finished beer.

The object of the present invention is to provide an effective and continuous reaction between wort and hops, and to give a closer control of production. If desired, the process forms a stage in a larger process, for continuous brewing.

The invention in its broadest form provides a continuous counterflow process for hopping wort in which hops and wort are caused to pass continuously at predetermined rates in counterflow through a system having a boiling zone wherein humulone and other desirable flavoring substances are being extracted from the hops by contact with boiling wort; the sequence in one direction being that fresh hops are being introduced at a controlled rate, are subsequently brought into contact with hopped wort near that end of the boiling zone from which hopped wort is being removed, are then being boiled with the wort in the boiling zone and then, at the other end of the boiling zone, the almost spent hops are being brought into contact with sweet wort and finally removed from the system; the sequence in the other direction being that hot sweet wort is being introduced at a controlled rate between the hop outlet point and the end of the boiling zone so as to come into contact initially with almost spent hops, is then being boiled with the hops in the boiling zone, and is finally being drawn off in hopped condition at the other end of the boiling zone near the place where the hops first encounter the hopped wort; the counterflow being so arranged that a substantial degree of the break tends to occur in the general region near the wort entry point, whereby a large proportion of the trub tends to be carried out of the system with the spent hops and to be carried away continuously from the boiling zone.

It will be appreciated that the boiling zone is intermediate to the points in the system at which the hops and the wort are introduced. Preferably the hops are conveyed through the system by mechanical means and the wort by gravity, although a wort pump may be desirable in some cases. Moreover, the system preferably includes a hop steaming zone to extract essential oils from the hops before they come into contact with wort, although this step may be carried out prior to introducing the hops into the system. It is also preferred to sparge the spent hops after they have passed the wort entry point and before they leave the system, although this step also may take place outside the system, in which case the sparging liquid, containing the last traces of the hopped wort, may be mingled with the incoming sweet wort before or at the point of introduction of the wort.

The invention in a preferred form provides a continuous counterflow process for hopping wort, comprising a system through which hops and wort are caused to pass continuously at variable and controlled rates in counterflow, and having an intermediate boiling zone wherein humulone and other desirable flavoring substances are being extracted from the hops by contact with boiling wort, the hops being conveyed through the system by mechanical means while the wort passes through the system by gravity; the sequence in one direction being that fresh hops are first being introduced at a controlled rate and are passing through a hop steaming zone near one end of the system to extract essential oils, the hops are next being brought into contact with hopped wort near that end of the boiling zone from which hopped wort is being removed, they are then being boiled with the wort in the boiling zone then, at the other end of the boiling zone, the almost spent hops are being brought into contact with sweet wort, then they are being sparged and finally they are being ejected from the system; the sequence in the other direction being that sweet wort is being introduced at a controlled rate and at high temperature between the sparging zone and the end of the boiling zone so as to come into contact initially with almost spent hops, is next being boiled with the hops in the boiling zone, and is finally being drawn off in hopped condition at the other end of the boiling zone near the place where the hops first encounter the hopped wort; the arrangement being such that (a) A substantial degree of the break tends to occur in the general region near the wort entry point, whereby a large proportion of the trub tends to be carried out of the system with the spent hops to be carried away continually from the boiling zone;

(b) The average dwell time of the hops can be adjusted by varying the speed of conveying the hops through the boiling zone; whilst the average dwell time of the wort can be adjusted by varying the effective volume of wort held;

(c) The amount of initial extraction of essential oils from the hops can be controlled by varying the conditions in the hop steaming zone, and (d) The sparging liquid washes out substantially all the residual wort from the spent hops, and flows down with such residue to mingle with the incoming sweet wort. By "sparging liquid" is meant water, liquor or wort sprinkled on to a bed of hops.

It is important that the rate of input of hops and wort should be variable and closely controlled in order to obtain consistent results. Control of the hops may be provided by employing a hop metering unit to feed the hops into the system. Control of the wort may be effected by a tap or similar metering device on the supply pipe, and we prefer to inject the wort by a steam atomiser or injector that acts to break the wort flow into droplets and to raise the temperature of the wort to induce a hot break as the droplets enter the system. This method of introduction ensures that the wort is well distributed throughout the hops at the point of entry. Removal of the spent hops may be effected by any suitable means, for example the system may be so arranged that the spent hops emerge at some point under the influence of gravity or they may be positively ejected by means such as a steam jet or the like.

Removal of hopped wort from the system is preferably effected by a controllable outlet, such as a weir of variable height.

Conveniently the boiling zone may be arranged in the manner of a U-tube into one leg of which hops are positively conveyed and into the other leg of which wort is fed and allowed to pass into the base of the U by gravity.

The hops may be carried through the system by a mechanical conveyor the elements of which are perforated or otherwise arranged to allow counterflow of wort. The variation of the speed of the conveyor serves to vary the dwell of the hops in the boiling zone. The emergence of wort from the other leg of the U, opposite to that into which it was introduced, will take place at a lower level than the wort entry point, this level being controlled by the aforementioned weir.

The effect of providing a variable weir for the outlet of the wort is to give a ready means of controlling the dwell of the wort in the system. In this way the dwell of the hops and the wort can each be controlled independently, or if desired can both be controlled and varied at the same time.

To achieve the necessary boiling in the boiling zone, which for example may be the base of the U, this zone is heated, as by a steam jacket, or by suitable electrical or other heating means.

The process may conveniently be followed by some method of deliberate extraction of precipitate at the "cold break" (break which occurs on cooling to fermentation temperature).

One embodiment of apparatus for carrying out the process of the invention will now be described with reference to the system shown in the accompanying diagrammatic drawing.

In this embodiment the shape of the circuit path has been primarily determined by two main factors. In the first place, the preferred means for moving the hops is a closed conveyor, containing an endless band which carries regularly spaced platforms acting to define a series of hop transfer pockets. In the second place, it is preferred to adopt the U-tube principle to hold the liquid column for boiling purposes. Taking both factors into consideration, the general shape of conveyor path illustrated in the drawing is both practical and economical, involving as it does, well defined semi-circular ends and parallel sides, one end being located substantially above the other. This arrangement permits a degree of inclination as illustrated, which may be found desirable in certain cases.

Considering the system in greater detail with reference to the drawings, the hop conveyor comprises an endless band 1, passing around an upper pulley 2 and a lower pulley 3 arranged substantially one above the other. This endless band is approximately twelve feet six inches in length and carries at intervals of six inches perforated slats or platforms 4, which project outwardly from the band about four inches and have a length corresponding to the band width of about one foot six inches. The conveyor is adapted to move in a clockwise direction by suitable motive power applied to one or both the pulleys 2, 3. The band runs within an enclosing casing of which only the outer wall 5 is illustrated for simplicity, the inner wall lying directly behind the band 1 on the side away from the platforms 4. The casing is of substantially rectangular cross-section, sufficiently wide and deep to give clearance for the platforms to move round the circuit within the casing while loaded with hops. The bottom part of the casing is in the form of a U-tube and is surrounded externally by a heating steam jacket 6. In order to admit the materials into the system, the outer wall of the casing is apertured at a number of places. There is an aperture for the entry of fresh hops at 7 and for the ejection of spent hops at 8. There is an aperture for admission of wort at 9 and for outlet of wort at 10. Steam for extracting essential oils from the hops is introduced into the casing at 11 and wet steam or water for sparging is introduced at 12. Scraper or scrubber means may be mounted on the conveyor to prevent build up of deposit, on the inner surface of the casing.

To control the admission of hops in measured and variable quantities, a hop metering unit is provided, indicated generally at 13, and including a motorised paddle type feeder 14 adapted to feed regular and substantially constant batches of hops continuously into the circuit. A steam jet or equivalent device 15 is provided, to eject hops from the system through the aperture 8 into a collecting pan or the like 16 from which they are removed continuously or intermittently.

The speed of the conveyor is about one foot per hour but may be varied by altering the driving speed of the pulleys.

Entry of wort into the circuit is effected by a steam jet 17, the nozzle of which blows across the nozzle 18 of the wort entry pipe 19. Wort emerges through the outlet pipe 20, which is vented at 21 and provided with a weir at 22 and an outlet branch 23. The plant in this embodiment has been designed for a processing or boiling time of approximately six hours, and for this purpose a liquid column 24 in the bottom of the U-shaped casing, is maintained at a substantially constant length of about six feet. This length may be adjusted by altering the height of the weir 22 as required, which alters the volume of wort in the circuit.

Considering first the progress of hops through the circuit, the feeder 14 is arranged to feed fresh hops at a rate of about twelve ounces per hour on to the platforms 4 as they move past the hop entry aperture 7. Thus approximately six ounces of fresh hops are admitted on to each platform, the feeder being preferably synchronised with the main conveyor. The fresh hops travel downwards on the perforated platforms 4 until they reach a steaming zone, located in the region of the steam entry 11. Here, steam, at approximately 220° F., is injected into the fresh hops to extract the essential oils by vaporisation, this steam being vented from the casing as diagrammatically indicated at 11a. As the hops move downwards they pass into the boiling zone, constituted by the U-shaped region surrounded by the steam jacket 6, which is maintained at a temperature of from 215° F. to 230° F. In this boiling zone is located the liquid column of wort 24, and the perforated platforms 4 carry the hops at a constant speed through this liquid column and up the opposite side of the circuit. The perforations in the platforms 4 and the slow speed of the conveyor enable the hops to be passed through the liquid column of wort in counterflow without substantial agitation.

The moving platforms 4 carry the hops upwardly past the wort entry point 9 towards the sparging zone, which is located between the wort entry point 9 and the sparge entry point 12. Continuing past the sparge entry point, the platforms 4 carry the hops (which by this time are spent) past the steam ejector 15 which forces the spent hops through the aperture 8 into the collecting pan 16, and at the same time, cleans off the platforms so that they are ready to pass round the top pulley of the conveyor and once again come into position to receive fresh hops from the feeder 14.

Considering next the progress of wort through the circuit, wort, at a temperature of approximately 160° F., is admitted at a controlled rate into the circuit. The wort is injected into the circuit by means of the steam jet 17, the steam being at a temperature of approximately 240° F. The incoming wort, in the form of a fine spray, is distributed over the spent hops on the platforms 4 in the region immediately below the wort entry point 9, and drains through the hops and perforations in the platform to supplement and maintain the liquid column 24. This liquid column is, in fact, a continuous column of wort counterflowing through the moving hops and the wort is allowed to emerge from the boiling zone, through the outlet 10 and outlet pipe 20, over the weir 22 and out of the outlet branch 23 where it is transferred to the next stage in the brewing process.

The throughflow of wort in the system is approximately eighteen gallons per hour and the dwell of the wort in the liquid column is controlled by the weir. Supplemental controls may be provided on the wort inlet pipe 19 and outlet pipe 20 to regulate the flow.

To sparge the spent hops and remove the dregs of the wort from them, water at 180° F. up to 212° F. or wet steam somewhat above 212° F. may be employed, being admitted at 12 and allowed to permeate the spent hops and drain downwardly through them and the perforated platforms 4 to mingle with the incoming wort in the wort entry zone. This sparging ensures that very little wort is carried away with the spent hops, since they are in the sparging zone for approximately one hour which gives ample drainage time.

One of the main advantages resulting from the above described arrangement is the concentration of much of the break in that region of the circuit towards the outlet for the spent hops. In that region of the circuit where the incoming wort is meeting outgoing spent hops, the sweet wort is in a "hungry" condition. The steam injection induces an early hot break of the wort and at the same time, contact of the hungry wort with the spent hops induces an early hop break. It seems likely that some degree of hop break is also taking place in the other leg of the circuit, where the fresh hops first meet the column of hopped wort but, so far as can be ascertained at present, the embodiment above described appears likely to give a considerably greater degree of extraction of trub than the traditional hopping process.

In the embodiment shown the steam jacket 6 is divided into two compartments by the partition 6a, this enables steam at differing temperatures to be introduced into these two compartments, and thus enables variation of the temperature of the wort in different parts of the boiling zone to be achieved. It will be appreciated that further division may be introduced into the steam zone to give a number of variations of temperature and that in the case of other means of heating, similar results may be obtained.

As regards the disadvantages of the traditional process specifically enumerated earlier, it will be noted that the concentration of the break effected in the present process enables a large proportion of trub to be carried out of the system by the departing spent hops and appears to minimise the amount of break actually taking place in the boiling zone. Furthermore, the sparging of the spent hops, which can be carried out under controlled conditions and varied in intensity, extracts most of the remaining traces of wort from the spent hops and carries it back into the system, thus improving the economy.

The use of a continuous process entails less and smaller types of equipment than the traditional process.

Close control can be exercised over the quantities of materials put into the system, their rates of movement through the system and the temperatures at which the process is operated. All these factors are capable of wide variations either separately or in combination. Moreover, with a continuous system of this kind, and provided that the quality of the materials put in is maintained constant, it is possible to arrange sampling devices acting on the outflowing wort and to link these with the process control system to adjust any one or more variables, should a change in the character of the outgoing wort take place. This was quite impossible with the traditional system.

Lastly, a close control of the vapourisation of essential oils in the hops, by carrying out this step before the hops come into contact with the wort, and under conditions in which the degree of steaming to which the hops are subjected can be adjusted within wide limits.

It should be appreciated that the examples of dimension, time and temperature stated in relation to the embodiment, are widely variable, dependent upon the volume to be treated in unit time, the ingredients and upon the character of wort which it is desired shall be produced; these variations will be obvious to skilled brewers.

We claim:

1. A continuous process for hopping wort, in which hops and wort are each caused to pass continuously at predetermined rates in counterflow, through a system having a boiling zone wherein flavoring substances are continuously extracted from said hops by contact with boiling wort; and a wort outlet zone and a hop entry zone at one end of said boiling zone and a wort entry zone and a hop outlet at the opposite end of said boiling zone; the sequence in one direction being that fresh hops are continuously introduced at a controlled rate into said hop entry zone, are thereafter brought into contact with hopped wort near that end of said boiling zone adjacent said wort outlet zone; said hops are then boiled with said wort during their passage through said boiling zone and at the other end of said boiling zone, the almost spent hops are brought into contact with incoming sweet wort and finally removed continuously from said system at said hop outlet zone; the sequence in the other direction being that said hot sweet wort is continuously introduced at a controlled rate into said wort entry zone between said hop outlet zone and one end of said boiling zone said wort thus coming into contact initially with almost spent hops, said wort is then boiled with said hops in said boiling zone, and is finally drawn off continuously in hopped condition the said wort outlet zone located at the other end of said boiling zone adjacent said hop entry zone, the counterflow being so arranged that a substantial degree of the break tends to occur in the general region near said wort entry zone, whereby a large proportion of the trub tends to be carried out of the system with the spent hops and to be carried away continuously from said boiling zone.

2. A process as claimed in claim 1 including a step in which the hops are subjected to steaming before they come into contact with the wort.

3. A process as claimed in claim 1, including a step in wihch the spent hops are sparged after they have travelled past the wort entry point.

4. A process as claimed in claim 3 in which the sparging liquid containing traces of hopped wort is re-cycled to mingle with wort entering the system.

5. A continuous process for hopping wort, comprising a system through which hops and wort are each caused to pass continuously at variable and controlled rates in counterflow, and having an intermediate boiling zone wherein flavoring substances are continuously extracted from the hops by contact with boiling wort, and a wort outlet zone and a hop entry zone at one end of said boiling zone and a wort entry zone and a hop outlet zone at the opposite end of said boiling zone; said hops being conveyed through said system by mechanical means while said wort passes through said system by gravity; the sequence, in one direction being that fresh hops are first continuously introduced at a controlled rate into said hop entry zone and are passed through a hop steaming zone near one end of the system to extract essential oils, said hops are next brought into contact with hopped wort near that end of said boiling zone adjacent said wort outlet zone, said hops are then boiled with said wort during their passage through said boiling zone and next, at the other end of said boiling zone, the almost spent hops are brought into contact with incoming hot sweet wort, are then sparged and finally are continuously ejected from said system at said hop outlet zone the sequence in the other direction being that said sweet wort is continuously introduced at a controlled rate and at high temperature into said wort entry zone between the sparging region and the end of said boiling zone said wort thus coming into contact initially with almost spent hops; said wort is then boiled with said hops in said boiling zone, and is finally drawn off continuously in hopped condition at said wort outlet zone located at the other end of said boiling zone adjacent said hop entry zone the arrangement being such that (a) a substantial degree of the break tends to occur in the general region near said wort entry zone, whereby a large proportion of the trub tends to be carried out of said system with the spent hops to be carried away continuously from said boiling zone;

(b) the average dwell time of said hops can be adjusted by varying the speed of conveying said hops through said boiling zone; whilst the average dwell time of said wort can be adjusted by varying the effective volume of said wort held;

(c) the amount of initial extraction of essential oils from said hops can be controlled by varying the time to temperature ratio of their passage through the hop steaming zone, and (d) the sparging liquid washes out substantially all the residual wort from the spent hops, and flows along with such residue to mingle with said incoming sweet wort.

6. A process as claimed in claim 1, in which the rate of input of hops and the rate of input of wort are variable.

7. A process as claimed in claim 5 in which the counterflow rate of the hops through the wort in the boiling zone is variable.

8. A process as claimed in claim 5 in which the dwell of the wort in the boiling zone is variable.

References Cited in the file of this patent

UNITED STATES PATENTS

| | | |
|---|---|---|
| 718,253 | Hobson | Jan. 13, 1903 |
| 732,350 | Henius | June 30, 1903 |
| 1,149,704 | Wahl | Aug. 10, 1915 |
| 2,163,468 | Rach | June 20, 1939 |
| 2,354,093 | Stein | July 18, 1944 |
| 2,843,870 | Ritter | July 7, 1959 |